(12) United States Patent
Wu et al.

(10) Patent No.: US 12,026,913 B2
(45) Date of Patent: Jul. 2, 2024

(54) AUTOMATED CALIBRATION AND VALIDATION OF SENSOR NETWORK

(71) Applicant: Shanghai United Imaging Intelligence Co., LTD., Shanghai (CN)

(72) Inventors: Ziyan Wu, Cambridge, MA (US); Srikrishna Karanam, Cambridge, MA (US); Meng Zheng, Cambridge, MA (US); Abhishek Sharma, Cambridge, MA (US)

(73) Assignee: Shanghai United Imaging Intelligence Co., Ltd., Shanghai (CN)

( * ) Notice: Subject to any disclaimer, the term of this patent is extended or adjusted under 35 U.S.C. 154(b) by 430 days.

(21) Appl. No.: 17/564,792

(22) Filed: Dec. 29, 2021

(65) Prior Publication Data

US 2023/0206496 A1    Jun. 29, 2023

(51) Int. Cl.
*G06T 7/80* (2017.01)
*G06T 7/30* (2017.01)

(52) U.S. Cl.
CPC . *G06T 7/80* (2017.01); *G06T 7/30* (2017.01)

(58) Field of Classification Search
CPC .... G06T 7/80; G06T 7/30; G06T 7/85; G06T 2207/10012; G01C 25/00; A61B 1/00163
See application file for complete search history.

(56) References Cited

U.S. PATENT DOCUMENTS

| | | | |
|---|---|---|---|
| 9,734,419 B1 | 8/2017 | Ye et al. | |
| 2017/0295358 A1* | 10/2017 | Cabral | H04N 17/002 |
| 2019/0028688 A1* | 1/2019 | Kumar | H04N 13/246 |
| 2021/0211635 A1* | 7/2021 | Shapira | H04N 13/239 |
| 2021/0256729 A1* | 8/2021 | Colmenares | G06T 7/33 |

* cited by examiner

*Primary Examiner* — Carol Wang
(74) *Attorney, Agent, or Firm* — Zhong Law LLC

(57) ABSTRACT

Automatically validating the calibration of an visual sensor network includes acquiring image data from visual sensors that have partially overlapping fields of view, extracting a representation of an environment in which the visual sensors are disposed, calculating one or more geometric relationships between the visual sensors, comparing the calculated one or more geometric relationships with previously obtained calibration information of the visual sensors, and verifying a current calibration of the visual sensors based on the comparison.

18 Claims, 3 Drawing Sheets

AUTOMATED CALIBRATION AND VALIDATION OF SENSOR NETWORK

FIELD

The aspects of the disclosed embodiments relate generally to sensor calibration and validation, and more particularly to automatically validating the calibration of a sensor network with multiple calibrated visual sensors without relying on any visible fiducial markers.

BACKGROUND

Maintaining valid calibration is crucial for multi-sensor-based global positioning systems. Even a tiny drift in position or rotation of one of the sensors can lead to significant degradation of positioning accuracy.

Existing sensor networks consisting of multiple visual or vision sensors are usually calibrated after installation. The calibration is used in applications such as positioning, three-dimensional (3D) reconstruction and measurements. Once calibrated, every sensor in the network is required to remain strictly stationary. Currently, in order to validate the calibration of such visual sensor networks, one needs to rely on precisely manufactured two-dimensional (2D)/three-dimensional (3D) calibration targets and expert knowledge, making it a challenge to be executed regularly.

Accordingly, it would be desirable to provide methods and apparatus that address at least some of the problems described above.

SUMMARY

The aspects of the disclosed embodiments are directed to automatically validating the calibration of a visual sensor network with multiple calibrated visual sensors without relying on any visible fiducial markers. This and other advantages of the disclosed embodiments are provided substantially as shown in, and/or described in connection with at least one of the figures, as set forth in the independent claims. Further advantageous modifications can be found in the dependent claims.

According to a first aspect, the disclosed embodiments are directed to an apparatus to automatically validate a calibration of visual sensors in a visual sensor network. In one embodiment the apparatus includes two or more visual sensors acquiring image data from partially overlapping field of views. A processor is configured to extract representations of the environment from the image data, calculate one or more forms of descriptions containing geometric relationships between one or more sub-groups of visual sensors, compare the one or more forms of descriptions with corresponding previously obtained calibration information, using one or more metrics. The processor is then configured to convert the results of the comparison into an indication related to the validity of the calibration of the visual sensors in the sensor network.

In a possible implementation form, the two or more visual sensors are calibrated with respect to a world coordinate system.

In a possible implementation form, the intrinsic parameters (K) and extrinsic parameters (E) of the two or more visual sensors are estimated.

In a possible implementation form, the descriptions containing geometric relationships between sub-groups of visual sensors can be an affine transformation, a rigid transformation, a fundamental matrix, an essential matrix, or a projection matrix.

In a possible implementation form, the representations of the environment extracted from the information acquired by the two or more visual sensors can be local feature descriptors.

In a possible implementation form, the geometric descriptors between one or more subgroups of the two or more visual sensors can be calculated from matched local descriptors across different visual sensors.

In a possible implementation form, the metrics comparing the geometric descriptions to the previously obtained calibration parameters of the sensor network can be predefined or learned.

In a possible implementation form, the processor is configured to convert the results of the comparison into an error matrix indicating drifts of one or more visual sensors in terms of 2D/3D translations and 2D/3D rotations.

In a possible implementation form, the processor is configured to overlay the visualization of the comparison results with one or more identifiable landmarks on the images obtained by one or more of the two or more visual sensors to verify the validity of the calibration of the visual sensor network.

In a possible implementation form, the fundamental or essential matrix (P) for the two or more visual sensors is estimated based on the intrinsic parameters (K) and the extrinsic parameters (E).

In a possible implementation form, feature descriptors are extracted from the image data acquired by the two or more visual sensors and matches detected.

In a possible implementation form, a fundamental or essential matrix (P') is estimated from the matched features for a pair of the two or more visual sensors.

In a possible implementation form, differences between the matrix (P) and the matrix (P') are identified.

In a possible implementation form, the calibration of the two or more visual sensors is verified if the differences between matrix (P) and matrix (P') are less than a predetermined threshold.

In a possible implementation form, the original calibration results of the two or more cameras are updated with the matrix (P') when the differences are greater than a predetermined threshold.

In a possible implementation form, the two or more visual sensors comprise a pair of visual sensors.

In a possible implementation form the apparatus includes at least one first visual sensor and at least one second visual sensor.

In a possible implementation form the two or more visual sensors form the visual sensor network or array.

In a possible implementation form the visual sensor network is a smart camera network or an intelligent camera network.

In a possible implementation form the at least two or more visual sensors are spatially distributed.

In a possible implementation form the a two or more visual sensors form a network of spatially distributed smart camera devices.

In a possible implementation form the two or more visual sensors form a wireless visual sensor network.

In a possible implementation form the two or more visual sensors are one or more of RGB cameras, depth cameras, RGB-D cameras or IR cameras.

In a possible implementation form, the visual sensor network includes one or more of stationary sensors and mobile sensors. Location and pose information of mobile sensors can be determined directly or indirectly when certain conditions are met. These conditions can include zero/reset position, information from robotic platforms, or information measured by other sensors.

In a possible implementation form, the apparatus is implemented in a medical environment.

According to a second aspect, the disclosed embodiments are directed to a method. In one embodiment, the method includes automatically validating a calibration of a visual sensor network that includes two or more visual sensors with partially overlapping fields of view by acquiring image data from the two or more visual sensors, extracting a representation of an environment from the acquired image data, calculating one or more geometric relationships between the two or more visual sensors, comparing the calculated one or more geometric relationships with previously obtained calibration information of the visual sensor network and verifying a current calibration of the two or more visual sensors based on the comparison.

In a possible implementation form, method further includes determining locations of mobile visual sensors of the two or more visual sensors based on one or more of a zero/reset position or measurements from other visual sensors in the visual sensor network.

In a possible implementation form, the method further includes calculating the geometric descriptors between the two or more visual sensors from matched local descriptors across different visual sensors of the two or more visual sensors.

In a possible implementation form, the method includes converting results of the comparison of the geometric description into an error matrix, wherein the error matrix is configured to indicate drifts of locations of the two or more visual sensors.

In a possible implementation form, the method includes representing the drifts of the locations as one or more of 2D/3D translations or 2D/3D rotations.

In a possible implementation form, the method includes overlaying a visualization of the comparison with one or more identifiable landmarks on the image data obtained by the two or more visual sensors and verifying a validity of the calibration by comparing identifiers on the comparison with the one or more landmarks on the image data.

According to a third aspect, the disclosed embodiments are directed to a computer program product embodied on a non-transitory computer readable medium, the computer program product comprising computer instructions that, when executed on at least one processor of a system or an apparatus, is configured to perform the possible implementation forms described herein.

According to a fourth aspect, the disclosed embodiments are directed to a device comprising means for performing the possible implementation forms described herein.

These and other aspects, implementation forms, and advantages of the exemplary embodiments will become apparent from the embodiments described herein considered in conjunction with the accompanying drawings. It is to be understood, however, that the description and drawings are designed solely for purposes of illustration and not as a definition of the limits of the disclosed invention, for which reference should be made to the appended claims. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

BRIEF DESCRIPTION OF THE DRAWINGS

In the following detailed portion of the present disclosure, the invention will be explained in more detail with reference to the example embodiments shown in the drawings, in which.

DETAILED DESCRIPTION OF THE DISCLOSED EMBODIMENTS

The following detailed description illustrates exemplary aspects of the disclosed embodiments and ways in which they can be implemented. Although some modes of carrying out the aspects of the disclosed embodiments have been disclosed, those skilled in the art would recognize that other embodiments for carrying out or practicing the aspects of the disclosed embodiments are also possible.

Figure 1:
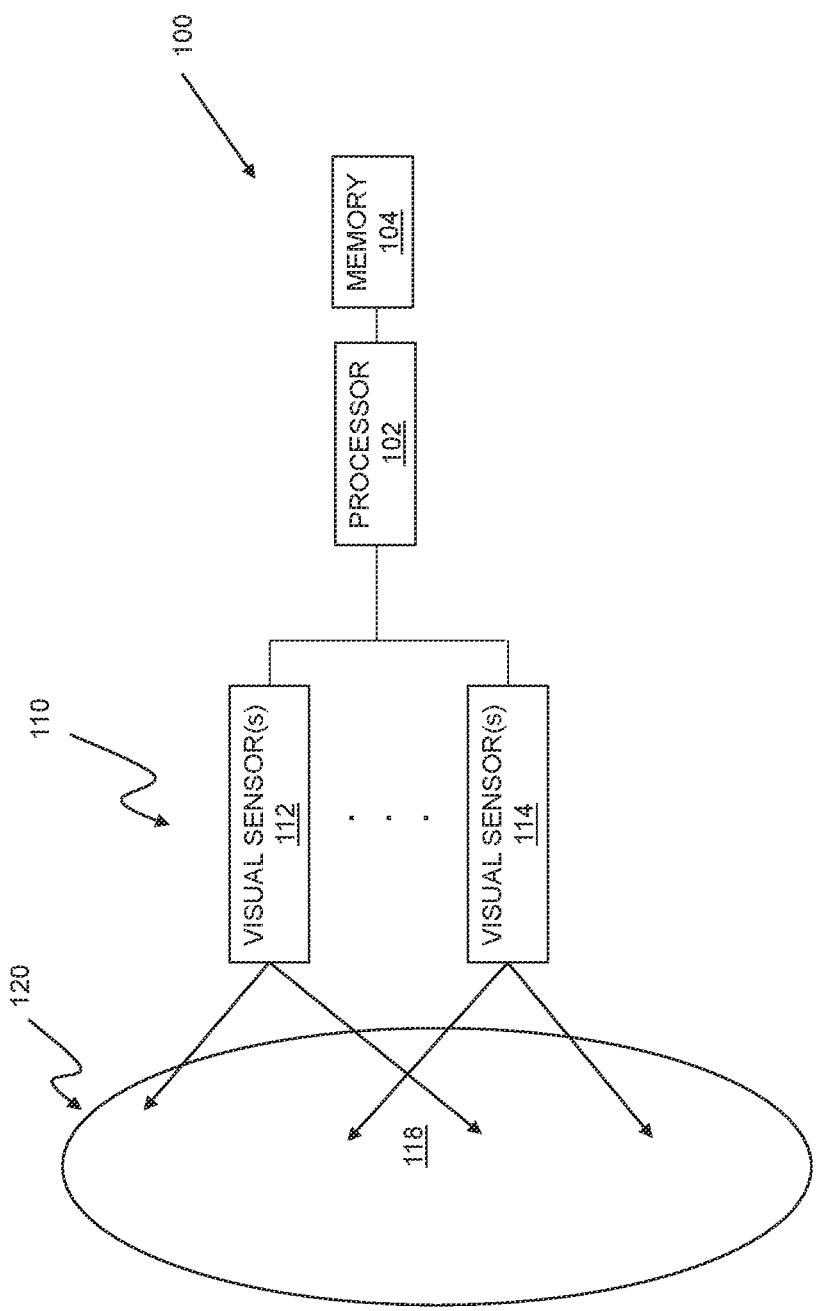
FIG. 1 is a block diagram of an apparatus incorporating aspects of the disclosed embodiments.

Referring to FIG. 1, a schematic block diagram of an exemplary apparatus 100 to automatically validate the calibration of visual sensors in a visual sensor network 110 is illustrated. The aspects of the disclosed embodiments are generally directed to automatically validating the calibration of a visual sensor network consisting of multiple calibrated visual sensors without relying on any visible fiducial markers.

As illustrated in FIG. 1, the apparatus 100 includes at least one processor 102 and two or more visual sensors 112, 114 of a visual sensor network 110. Although only two visual sensors 112, 114 are shown in the example of FIG. 1, the aspects of the disclosed embodiments are not so limited. In alternate embodiments, the apparatus 100 can include or be connected to any suitable number of visual sensors, other than including two.

In one embodiment, the visual sensors 112, 114 will form one or more pairs of visual sensors, also referred to as a group or sub-group of the sensor network 110. The visual sensors 112, 114 in the sensor network 110 are configured to have at least partially overlapping fields of view 118 of an environment 120. Although "pairs" of visual sensors are generally referred to herein, the aspects of the disclosed embodiments are not so limited. In alternate embodiments, any suitable number of visual sensors can be included in a group or sub-group of visual sensors, other than including two or a pair.

In one embodiment, the visual sensors 112, 114 are initially calibrated at installation. Visual sensors in a sensor network are typically calibrated after installation. The aspects of the disclosed embodiments are configured to validate the calibration of the visual sensor 112 and the visual sensor 114 in the sensor network 110.

In one embodiment, the visual sensors 112, 114 are configured to acquire image data or images of the environment 120. The processor 102 is configured to process the image data acquired from the visual sensors 112, 114 and extract representations of the environment 120. In one embodiment, the representations of the environment 120 extracted from the information acquired by the visual sensors 112, 114 are local feature descriptors.

In one embodiment, the processor 102 is configured to calculate one or more forms of descriptions, also referred to as geometric descriptions or descriptors. The descriptions contain or identify geometric relationships between the visual sensors 112, 114.

In one embodiment, the visual sensors 112, 114 can be divided or organized into groups, or subgroups, of visual sensors. In this example, the descriptions or descriptors can include the geometric relationships between one or more of the groups of visual sensors in the visual sensor network 110.

In one embodiment, the descriptions containing geometric relationships between groups of visual sensors in the visual sensor network 110 can be an affine transformation, rigid transformation, fundamental matrix, essential matrix, or a projection matrix. In one embodiment, the geometric descriptors between one or more groups of visual sensors of the visual sensor network 110 can be calculated from matched local descriptors across different visual sensors of the visual sensor network 110.

In one embodiment, the metrics comparing the geometric descriptions to the previously obtained calibration parameters of the visual sensors 112, 114 of the visual sensor network 110 can be either predefined or learned.

In one embodiment, the processor 102 is configured to compare the geometric descriptions associated with the visual sensors 112, 114 with previously obtained calibration information associated with the two or more visual sensors 112, 114. In one embodiment, metrics are used to compare the descriptions associated with the visual sensors 112, 114.

In one embodiment, the results of the comparison of the geometric description to the calibration information are converted into an error matrix. The error matrix is configured to indicate drifts of the visual sensors 112, 114 in terms of 2D/3D translations and 2D/3D rotations.

In one embodiment, a visualization of the comparisons of the geometric descriptions is overlaid onto one or more identifiable landmarks on images that are obtained by the visual sensors 112, 114. This visualization can assist in verifying the validity of the calibration of the visual sensors 112, 114 of the visual sensor network 110.

In one embodiment, the processor 102 is configured to covert the results of the comparison of the different descriptions into an indication. The indication is generally related to a validity of the calibration of the visual sensors 112, 114 in the sensor network 110.

The visual sensors 112, 114 of the visual sensor network 110 can comprise any suitable type of visual sensors. Examples of such visual sensors can include, but are not limited to, red-blue-green (RGB) cameras, depth cameras, RGB-D cameras, infrared (IR) cameras or smart cameras.

The visual sensor network 110 can include one or more of stationary visual sensors or mobile visual sensors. When the visual sensors are mobile visual sensors, the location and pose of such mobile visual sensors can be determined directly or indirectly. The conditions under which the location and pose of such mobile visual sensors can be determined include a zero/reset position, from robotic platforms or as measured by other visual sensors.

Figure 2:
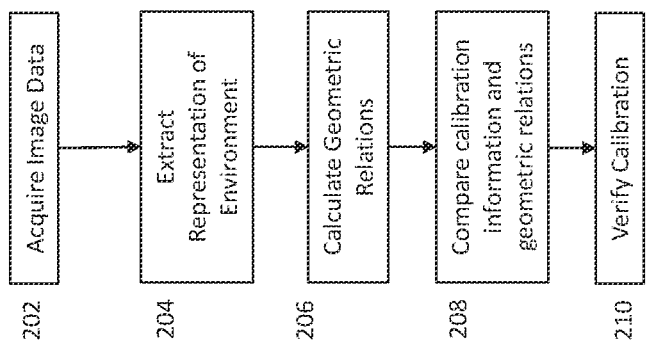
FIG. 2 is a flowchart illustrating an exemplary process flow incorporating aspects of the disclosed embodiments.

FIG. 2 is a flow chart illustrating an exemplary process incorporating aspects of the disclosed embodiments. In one embodiment, automatically validating a calibration of visual sensors 112, 114 in a visual sensor network 110 includes acquiring 202 image data from the visual sensors 112, 114. In one embodiment, the fields of view of the visual sensors are partially overlapping.

In one embodiment, a representation of an environment 120 in which the visual sensors 112, 114 are located or receiving information from is extracted 204 from the acquired image data. The representations of the environment 120 extracted from the information acquired by the visual sensors 112, 114 can be local feature descriptors.

In one embodiment, one or more geometric relationships or descriptors are calculated 206 between the visual sensors 112, 114. The geometric descriptors between the visual sensors 112, 114 can be calculated from matched local descriptors across different visual sensors of the visual sensor network 110. When the visual sensors 112, 114 are mobile type visual sensors, the locations of the mobile visual sensors can be calculated based on one or more of a zero/reset position or measurements from other visual sensors in the visual sensor network 110.

The calculated geometric relationships or descriptors are compared 208 with previously obtained calibration information of the sensor network 110. In one embodiment, the results of the comparison of the geometric description can be converted into an error matrix. The error matrix is configured to indicate drifts of the locations of the visual sensors 112, 114. In one embodiment, the drifts of the locations can be represented as one or more of 2D/3D translations or 2D/3D rotations.

The current calibration of the visual sensors 112, 114 is verified 210 based on the comparison. If a result of the comparison does not exceed a predetermined threshold, the current calibration is considered to still be valid. If the result of the comparison exceeds the predetermined threshold, the current calibration can be considered void. In this case, the visual sensors 112, 114 need to be re-calibrated. This can include for example, updating the original calibration results with the calculated geometric relations or descriptors.

In one embodiment, a visualization of the comparison is overlaid with one or more identifiable landmarks on images obtained by the visual sensors 112, 114. The validity of the calibration can be verified by comparing identifiers on the comparison with the one or more landmarks on the images.

Figure 3:
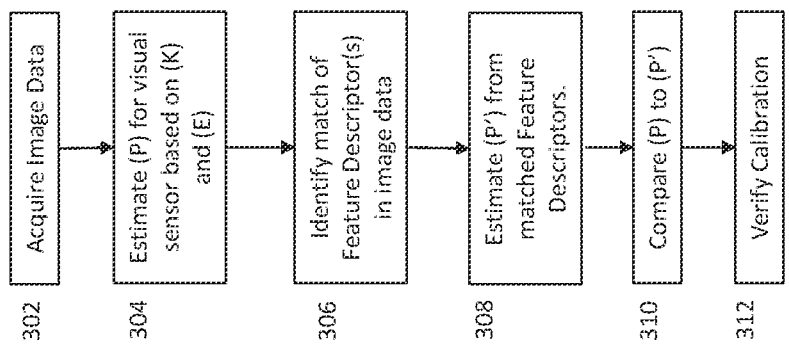
FIG. 3 is a flowchart illustrating an exemplary process flow incorporating aspects of the disclosed embodiments.

FIG. 3 is another example of a process including aspects of the disclosed embodiments. In this example, referring also to FIG. 1, the installation of the visual sensors or cameras 112, 114 can include calibrating the cameras 112, 114 with respect to a world coordinate system and estimating the intrinsic parameters (K) and the extrinsic parameters (E) of the cameras 112, 114.

After the installation, when the apparatus 100 of FIG. 1 is activated, as is shown in FIG. 3, image data is acquired 302 from at least a pair of visual sensors or cameras 112, 114 of the visual sensor network 110. The visual sensors 112, 114 in this example will have at least a partially overlapping field of view.

In one embodiment, a fundamental or essential matrix (P) is estimated or calculated 304 for the cameras 112, 114 based on their intrinsic parameters (K) and extrinsic parameters (E). The fundamental or essential matrix (P) represents the relative spatial relationship of the cameras 112, 114 in three dimensions (3D) at the installation of the cameras 112, 114.

In one embodiment, matches between feature descriptors extracted from the image data acquired by the cameras 112, 114 can be identified 306. A matched feature descriptor between images from the cameras 112, 114 represents the same location in the scene or environment 120.

A fundamental or essential matrix (P') can be estimated 308 based on the matched feature descriptors. The fundamental or essential matrix (P') represents a relative spatial relationship of the cameras 112, 114 in 3D at the current time.

The matrix (P) is compared 310 to the matrix (P') in order to determine or identify the differences between matrix (P) and matrix (P'). The calibration of cameras 112, 114 is verified 312 based on the differences.

For example, if the difference between matrix (P) and matrix (P') is less than a pre-determined threshold value, this indicates that the original calibration of the cameras 112, 114 is still valid. On the other hand, if the difference between matrix (P) and matrix (P') is greater than a pre-determined threshold value, this can indicate that the original calibration of the cameras 112, 114 is void and the cameras 112, 114 need to be recalibrated. In one embodiment, the recalibration of the cameras 112, 114 can include updating the original calibration data of the cameras 112, 114 based on the fundamental or essential matrix (P').

In one embodiment, the apparatus 100 is configured to be implemented in a medical environment or medical imaging environment. In one embodiment, the apparatus 100 is disposed on or in connection with a medical imaging device or equipment. Examples of such medical systems can include, but are not limited to, x-ray systems, medical resonance imaging (MRI) systems, computed tomography (CT) systems, and surgical robotic systems. In alternative embodiments, the apparatus 100 can be embodied in or part of any suitable device or system where verification of a calibration of a visual sensor network is desired.

In one embodiment, the apparatus 100 shown in FIG. 1, generally comprises a computing device. The computing device can comprise or include any suitable computer or computing arrangement.

In one embodiment, the processor 102 comprises a hardware processor. Although only one processor 102 is generally described herein, the aspects of the disclosed embodiments are not so limited. In alternate embodiments, the apparatus 100 can include any suitable number of processors 102.

The apparatus 100 generally includes suitable logic, circuitry, interfaces and/or code that is configured to receive the information from the visual sensors 112, 114 and process the information as is generally described herein.

The processor 102 generally includes suitable logic, circuitry, interfaces and/or code that is configured to process the information and data as is generally described herein. The processor 102 is configured to respond to and process instructions that drive the apparatus 100. Examples of the processor 102 include, but are not limited to, a microprocessor, a microcontroller, a complex instruction set computing (CISC) microprocessor, a reduced instruction set (RISC) microprocessor, a very long instruction word (VLIW) microprocessor, or any other type of processing circuit. Optionally, the processor 102 may be one or more individual processors, processing devices and various elements associated with a processing device that may be shared by other processing devices. Additionally, the one or more individual processors, processing devices and elements are arranged in various architectures for responding to and processing the instructions that drive the system 100. The apparatus 100 can include any suitable components or devices that are needed to carry out the processes described herein, such as a memory or storage, for example.

In one embodiment, the apparatus 100 can comprise or be part of a standalone computing device, in communication with, or part of, the equipment 10. In one embodiment, the apparatus 100 will include or be connected to the machine learning models needed to carry out the aspects of the disclosed embodiments described herein.

In the example of FIG. 1, the apparatus 100 also includes or is communicatively coupled to a memory 104. Although not shown, the apparatus 100 could be communicatively coupled to network or network interface to enable communication with the components and devices of the apparatus 100 and equipment 10.

The memory 104 may comprise suitable logic, circuitry, interfaces, and/or code that may be configured to store instructions executable by the processor 102. The memory 104 is further configured to store the sensor information, state information and predictions. The memory 104 may be further configured to store operating systems and associated applications of the processor 102. Examples of implementation of the memory 104 may include, but are not limited to, Random Access Memory (RAM), Read Only Memory (ROM), Hard Disk Drive (HDD), Flash memory, and/or a Secure Digital (SD) card. A computer readable storage medium of a computer program product for providing a non-transient memory may include, but is not limited to, an electronic storage device, a magnetic storage device, a visual storage device, an electromagnetic storage device, a semiconductor storage device, or any suitable combination of the foregoing.

The aspects of the disclosed embodiments are directed to automatically validating the calibration of visual sensors in a visual sensor network. This can include detecting and quantifying any drift of the visual sensors. The calibration of the visual sensors in the visual sensor network can be verified without relying on any visible fiducial markers.

Various embodiments and variants disclosed above, with respect to the aforementioned system 100, apply mutatis mutandis to the method. The method described herein is computationally efficient and does not cause processing burden on the processor 102.

Modifications to embodiments of the aspects of the disclosed embodiments described in the foregoing are possible without departing from the scope of the aspects of the disclosed embodiments as defined by the accompanying claims. Expressions such as "including", "comprising", "incorporating", "have", "is" used to describe and claim the aspects of the disclosed embodiments are intended to be construed in a non-exclusive manner, namely allowing for items, components or elements not explicitly described also to be present. Reference to the singular is also to be construed to relate to the plural.

Thus, while there have been shown, described and pointed out, fundamental novel features of the invention as applied to the exemplary embodiments thereof, it will be understood that various omissions, substitutions and changes in the form and details of devices and methods illustrated, and in their operation, may be made by those skilled in the art without departing from the spirit and scope of the presently disclosed invention. Further, it is expressly intended that all combinations of those elements, which perform substantially the same function in substantially the same way to achieve the same results, are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An apparatus for automatically validating a calibration of visual sensors in a visual sensor network, comprising:
   a first visual sensor configured to acquire image data from a first field of view of an environment:
   a second visual sensor configured to acquire image data from a second field of view of the environment, where the first field of view and the second field of view are at least partially overlapping; and
   a processor communicably coupled to the first visual sensor and the second visual sensor, wherein the processor is configured to:
      extract a representation of the environment from the image data acquired from the first visual sensor and the image data acquired from the second visual sensor;
      calculate one or more geometric relationships between the first visual sensor and the second visual sensor;
      compare the calculated one or more geometric relationships with prior calibration information of the first visual sensor and the second visual sensor;
      overlay a visualization of the comparison with one or more identifiable landmarks on the image data acquired from the first visual sensor and the second visual sensor; and
      verify a validity of a current calibration of the first visual sensor and the second visual sensor by comparing identifiers on the visualization of the comparison with the one or more identifiable landmarks on the image data acquired from the first visual sensor and the second visual sensor.

2. The apparatus according to claim 1, wherein the one or more geometric relationships are based on one or more of an affine transformation, a rigid transformation, a fundamental matrix, an essential matrix or a projection matrix.

3. The apparatus according to claim 1, wherein the representation of the environment comprises local feature descriptors.

4. The apparatus according to claim 1, wherein the processor is further configured to calculate the one or more geometric relationships from matched local descriptors of the first visual sensor and the second visual sensor.

5. The apparatus according to claim 1, wherein the comparison of the one or more geometric relationships with the prior calibration information of the first visual sensor and the second visual sensor are predefined or learned.

6. The apparatus according to claim 1, wherein the processor is further configured to convert results of the comparison of the one or more geometric relationships with the prior calibration information into an error matrix, and wherein the error matrix is configured to indicate location drifts of the first visual sensor and the second visual sensor.

7. The apparatus according to claim 6, wherein the processor is further configured to represent the location drifts as one or more of 2D/3D translations or 2D/3D rotations.

8. The apparatus according to claim 1, wherein the first visual sensor and the second visual sensor comprise one or more of a red-green-blue (RGB) camera, a depth camera, an RGB-D camera or an infra-red (IR) camera.

9. The apparatus according to claim 1, wherein the visual sensor network comprises one or more of stationary visual sensors and mobile visual sensors.

10. The apparatus according to claim 9, wherein the processor is further configured to determine locations of the mobile visual sensors based on one or more of a zero/reset position or measurements from other visual sensors in the visual sensor network.

11. The apparatus according to claim 1, wherein the processor is further configured to:
   estimate a fundamental or essential matrix (P) for the first visual sensor and the second visual sensor based on intrinsic parameters (K) and extrinsic parameters (E) of the first visual sensor and the second visual sensor;
   identify matches of feature descriptors between the image data acquired by the first visual sensor and the second visual sensor;
   estimate a fundamental or essential matrix (P') for the first visual sensor and the second visual sensor based on the identified matches; and
   verify the current calibration of the first visual sensor and the second visual sensor based on a comparison of the fundamental or essential matrix (P) with the fundamental or essential matrix (P').

12. A computer implemented method comprising:
   automatically validating a calibration of a visual sensor network by:
      acquiring image data from two or more visual sensors with partially overlapping fields of view;
      extracting a representation of an environment from the acquired image data;
      calculating one or more geometric relationships between the two or more visual sensors;
      comparing the calculated one or more geometric relationships with calibration data of the two or more visual sensors;
      overlaying a visualization of the comparison with one or more identifiable landmarks on the image data acquired from the two or more visual sensors; and
      verifying a validity of a current calibration of the two or more visual sensors by comparing identifiers on the visualization of the comparison with the one or more identifiable landmarks on the image data acquired from the two or more visual sensors.

13. The computer implemented method according to claim 12, further comprising calculating the one or more geometric relationships between the two or more visual sensors from matched local descriptors across different visual sensors of the two or more visual sensors.

14. The computer implemented method according to claim 12, further comprising converting results of the comparison of the one or more geometric relationships with the calibration data into an error matrix, wherein the error matrix is configured to indicate location drifts of the two or more visual sensors.

15. The computer implemented method according to claim 14, further comprising representing the location drifts as one or more of 2D/3D translations or 2D/3D rotations.

16. The computer implemented method according to claim 12, further comprising:
   estimating a fundamental or essential matrix (P) for the two or more visual sensors based on intrinsic parameters (K) and extrinsic parameters (E) of the two or more visual sensors;
   identifying matches of feature descriptors between the image data acquired by the two or more visual sensors;
   estimating a fundamental or essential matrix (P') for the two or more visual sensors based on the identified matches; and verifying the current calibration of the two or more visual sensors based on a comparison of the fundamental or essential matrix (P) with the fundamental or essential matrix (P').

17. The computer implemented method according to claim 12, wherein the two or more visual sensors comprise at least one mobile visual sensor and the method further includes determining a location of the at least one mobile visual sensor based on one or more of a zero/reset position or measurements from other visual sensors in the visual sensor network.

18. A computer program product comprising a non-transitory computer-readable medium having machine-readable instructions stored thereon, which when executed by a computer causes the computer to execute the method according to claim 12.

* * * * *